(12) United States Patent
Joko et al.

(10) Patent No.: US 8,497,903 B2
(45) Date of Patent: Jul. 30, 2013

(54) MONITORING SYSTEM AND TERMINAL DEVICE

(75) Inventors: Toshikazu Joko, Osaka (JP); Eiichi Takano, Osaka (JP)

(73) Assignee: NSJ Co., Ltd., Osaka-Shi (JP)

( * ) Notice: Subject to any disclaimer, the term of this patent is extended or adjusted under 35 U.S.C. 154(b) by 1131 days.

(21) Appl. No.: 12/219,155

(22) Filed: Jul. 17, 2008

(65) Prior Publication Data

US 2010/0013921 A1    Jan. 21, 2010

(51) Int. Cl.
*H04N 7/18* (2006.01)

(52) U.S. Cl.
USPC .................................. 348/143; 348/E7.085

(58) Field of Classification Search
USPC ........................................ 348/143, E07.085
See application file for complete search history.

(56) References Cited

U.S. PATENT DOCUMENTS

| | | | |
|---|---|---|---|
| 7,840,203 B2 * | 11/2010 | Shin | 455/404.1 |
| 7,928,840 B2 * | 4/2011 | Kim et al. | 340/531 |
| 2006/0064477 A1 * | 3/2006 | Renkis | 709/223 |
| 2006/0143672 A1 * | 6/2006 | Renkis | 725/105 |
| 2007/0082700 A1 * | 4/2007 | Landschaft et al. | 455/557 |
| 2008/0158358 A1 * | 7/2008 | Chanson et al. | 348/148 |
| 2008/0178251 A1 * | 7/2008 | Shin | 725/141 |

* cited by examiner

*Primary Examiner* — Mohamed Ibrahim
*Assistant Examiner* — Thomas Richardson
(74) *Attorney, Agent, or Firm* — Manabu Kanesaka

(57) ABSTRACT

A monitoring system for surveiling an object substance includes plural movable bodies periodically patrolling surveillance areas each having a prescribed area and acquiring image data and/or audio data showing statuses during a patrol, an area local control institution installed in each of the surveillance areas for receiving from the movable bodies and storing various data including the image data and/or audio data, plural communicating devices installed in the surveillance areas for functioning as access points for building up a wireless network and a terminal device the object substance takes along or is provided with.

4 Claims, 5 Drawing Sheets

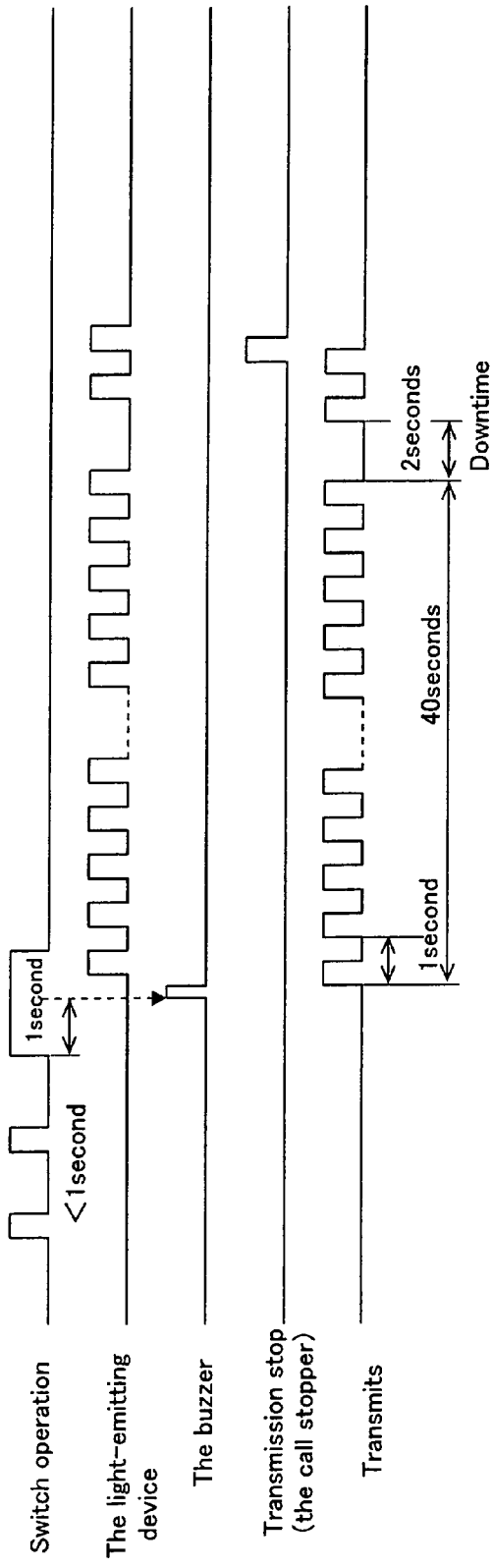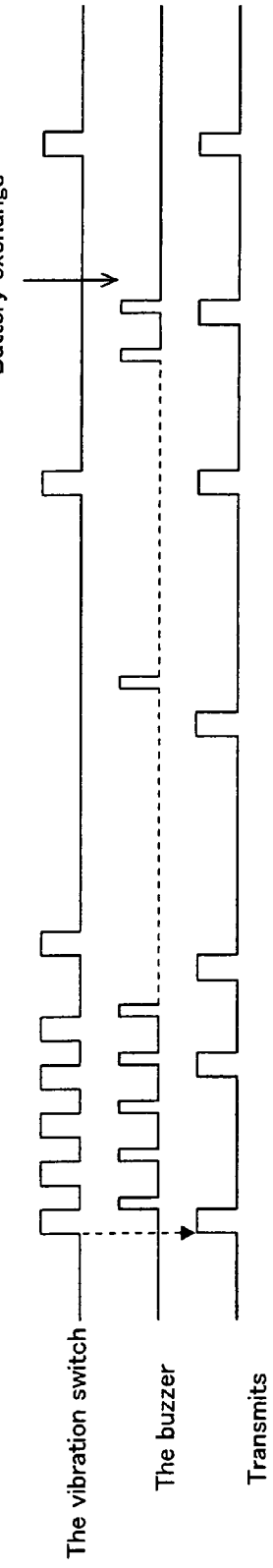

MONITORING SYSTEM AND TERMINAL DEVICE

BACKGROUND OF THE INVENTION

1. Field of the Invention

The present invention relates to a monitoring system for monitoring a prescribed object to be monitored and to a terminal device used in the monitoring system.

2. Description of the Prior Art

In recent years, criminals mainly including sneak thieves have rapidly increased and the methodologies thereof have become artful and rough. Therefore, subscriptions to monitoring systems by security companies have been grown steadily. As the monitoring system there has been known the type of surveiling a prescribed surveillance comprising visually discerning via a prescribed surveillance monitor an image imaged by a surveillance camera installed around the entrance of a dwelling house or within a location and, every time we have had a problem, reporting the problem. Furthermore, in recent years, a monitoring system utilizing a patrol of a movable body, such as a vehicle, in order to surveil in a comprehensive manner a wide range of regions besides predetermined facilities (refer, for example, JP-A 2002-279561 and JP-A 2004-185581).

To be specific, JP-A 2002-279561 discloses a security assistance system utilizing a taxi, comprising various kinds of sensors provided within a house, means for sensing information from the sensors and an automatic calling unit receiving the information from the means, raising an alarm over the outside of the house and calling for a taxi company by telephone.

On the other hand, JP-A 2004-185581 discloses a security system by a mobile patrol center having a vehicle used as the mobile patrol center without using major-scale mission control.

There has recently been infestation of atrocious crimes including abduction of school children on their way between school and home or others and burglary of goods besides automatic vending machines installed throughout a town, vehicles parked outdoors. Therefore, techniques for keeping these crimes from occurring have been proposed (refer, for example, to JP-A 2004-328018 and JP-A 2005-182469).

To be specific, JP-A 2004-328018 discloses a region-monitoring system having a function to detect outgo of a person to be surveiled (hereinafter referred to as the "object person") from a specific region, intrusion of the object person on the specific region and aberrance in motion of the object person. Particularly, this region-monitoring system comprises a mobile p hone equipped with a Global Positioning System (GPS) the object person takes along, a position search center that requires along a prescribed schedule the mobile phone with the GPS to transmit position data and receives the position data from the mobile phone with the GPS, and a service center that receives the position data from the position search center and, when the position data have fallen outside or within a prescribed region determined in advance by a surveillant, transmits an electronic mail to a mobile phone of the surveillant. Thus, according to this region-monitoring system, since the surveillant is not required to confirm the position every time insofar as the object person stays within his ordinary field range of activities, surveillance can be performed without effort. In addition, since the substance the object person has to take along is a mobile phone, it is said that the object person is open to taking along it.

In addition, JP-A 2005-182469 discloses a school child security communications method for automatically transmitting to a benefactor of a school child a message on whether the school child reaches the school or not. Particularly, in this school child security communications method, the procedure thereof comprises registering the ID of a school child and the activity schedule data on a data server, using a wireless read-out system to read out the ID of the school child from a wireless tag system when the school child starts from home toward a school, transmitting to the data server the ID of the school child and the time the school child starts toward the school and using the data server to calculate a predicted time of arriving at school based on the activity schedule data and the time the school child starts toward the school. In the school child security communications method, when the school child has reached at school, while the wireless readout system is used to read out the ID of the school child from the wireless tag system and transmit the ID of the school child and the predicted time of arriving at school to the data server, it transmits emergency signals to the benefactor when the data server fails to receive the ID of the school child and the predicted time of arriving at school even in a prescribed period of time after the predicted time of arriving at school. In the case of the school child coming out of school, the school child security communications system takes the same procedure. As a result, it is said that the school child security communications method can call benefactor's attention to school child security at an appropriate timing because it transmits emergency signals to the benefactor in the case where the school child has not completed reaching at school or coming out of school in the prescribed period of time after the predicted time of arriving at school or home.

In the meanwhile, the conventional monitoring systems utilizing a patrol of a movable body including the techniques disclosed in JP-A 2002-279561 and JP-A 2004-185581 have posed a problem in that crimes occurring in regions not patrolled by the movable body cannot rapidly be coped with.

In addition, in the monitoring system utilizing a GPS including the technique disclosed in JP-A 2004-328018, problems have been raised in that the object person taking along a terminal device has to bear expensive connection fees and that detailed surveillance on a small region-by-region basis cannot be attained.

Furthermore, since the technique disclosed in JP-A 2005-182469 merely judges the presence or absence of aberrance based on the object person's activity start and completion times, if a crime should occur, it will be impossible to specify the crime-occurring locality. This has been problematic.

The present invention has been accomplished in view of these circumstances. The object of the present invention is to provide a monitoring system capable of infallibly grasping the position of a substance to be surveiled (hereinafter referred to as the "object substance") at low cost without utilizing any GPS and, when an unusual situation has come about, specifying the locality thereof and rapidly and infallibly recognizing the fact that aberrance has occurred, an aberrance-occurring locality and an aberrance-occurring time and to provide a terminal device used in the monitoring system.

SUMMARY OF THE INVENTION

To achieve the aforementioned object, the present invention provides a monitoring system for surveiling an object substance, comprising plural movable bodies periodically patrolling surveillance regions each having a prescribed area and acquiring image data and/or audio data showing statuses during a patrol, a region local control institution installed in each of the surveillance regions for receiving from the movable bodies and storing various data including the image data and/or audio data, plural communicating devices installed in the surveillance regions for functioning as access points for building up a wireless network and a terminal device the object substance takes along or is provided with, wherein the terminal device normally transmits its transmit data including identifier data peculiar to the terminal device to a nearest communication device continuously, wherein the communication devices upon receiving the transmit data produce their transmit data added with identifier data peculiar to the communication devices and present time data showing a present time and transmit the produced transmit data to the region local control institution utilizing the wireless network, wherein the region local control institution grasps a position of the object substance based on the identifier data of the terminal device included in the transmit data of the communication devices, on the identifier data of the communication devices having received the transmit data of the terminal device and on the present time data having received the transmit date of the terminal device, wherein the terminal device upon aberrance having occurred transmits continuously to a nearest communication device its transmit data including the identifier data peculiar to the terminal device and shot data showing that the aberrance has occurred, wherein the communication devices upon receiving the transmit data of the terminal device produce their transmit data having the identifier data peculiar to the communication devices and the present time data showing the present time added to the transmit data of the terminal device and transmit the produced transmit data to the region local control institution utilizing the wireless network, and wherein the region local control institution grasps a fact that the aberrance has occurred relative to the object substance, an aberrance-occurring locality and an aberrance-occurring time based on the identifier data of the terminal device included in the transmit data of the communication devices, on the identifier data of the communication devices having received the transmit data of the terminal device and on the present time data having received the transmit data of the terminal device.

In the monitoring system of the present invention, the region local control institution is disposed in each of the surveillance regions and, at the same time, the movable bodies are allowed to patrol the surveillance regions and furthermore the wireless network is built up over the entire surveillance regions via the communication devices. As a result, it is made possible to sort out an unprecedented, considerably highly dense system of surveillance. Moreover, in the monitoring system of the present invention, by allowing the object substance to take along or be provided with the terminal device and continuously transmitting the transmit data of the terminal device to the communication devices, the region local control institution can infallibly grasp the position of the object substance and, when aberrance has occurred relative to the object substance, specify as the aberrance-occurring locality a footprint of the communication device having received the transmit data of the terminal device including the shot data and recognize the fact that the aberrance has occurred, aberrance-occurring locality and aberrance-occurring time.

To be concrete, the terminal device can be configured such that it continuously transmits the transmit data of the terminal device including the identifier data peculiar to the terminal device during detecting vibration exerted on the terminal device in response to the activity of the object substance. This configuration is effective when the object substance is a human being or an animal. In addition, the terminal device can be configured such that it continuously transmits the transmit data of the terminal device including the identifier date peculiar to the terminal device during no exertion of vibration on the terminal device and, when the vibration is exerted on the terminal device, transmits the transmit data including the identifier data peculiar to the terminal device and shot data showing that the aberrance has occurred. This configuration is effective when the object substance is an article.

In addition, it is desirable that the terminal device should stop its transmit data including the identifier data peculiar to the terminal device and shot data showing the occurrence of aberrance upon receiving a call-stopping signal transmitted from a call stopper operated in a state of being disposed in the vicinity of the terminal device. That is to say, in the monitoring system of the present invention, even when the object substance has encountered an abductor or a thief, the criminal cannot stop the transmit data of the terminal device, thereby making it possible to maintain the action of shot.

Furthermore, it is desirable that the terminal device should measure the voltage of a battery to which a driving power is supplied and, when the measured voltage is not more than a prescribed voltage, call in the fact. With this, in the monitoring system of the present invention, it is possible to infallibly prevent the terminal device from failing to operate when aberrance has occurred. In this case, it is desirable that the terminal device should measure the voltage of the battery in order to reduce the battery drain only when the operation of transmitting the transmit date of the terminal device starts.

In addition in the monitoring system of the present invention, the region local control institution transmits a signal to a mobile communication terminal device of a user requesting the surveillance of the object substance in the case where the transmit data of the communication device shows the time aberrance has occurred. With this, in the monitoring system of the present invention, the user is capable of rapidly know the fact that the aberrance has occurred.

Incidentally, in the monitoring system of the present invention, since the location information of the movable bodies is transmitted to the region local control institution, normal patrols of the movable bodies can be promoted.

In addition, the terminal device capable of accomplishing the aforementioned object is of a type which a prescribed object substance takes along or is provided with and which comprises transmitting means for transmitting data to the plural communication devices installed in the surveillance regions each having a prescribed area and functioning as access points for building up the wireless network and control means for continuously transmitting to the nearest communication device at normal times data including the identifier data peculiar to the terminal device and, when aberration occurs, continuously transmitting to the nearest communication device data including the identifier data peculiar to the terminal device and shot data showing the fact that the aberration has occurred.

In this way, according to the terminal device of the present invention, by utilizing the wireless network provided over the entire surveillance regions via the transmission devices to continuously transmit the data to the communication devices, it is made possible to infallibly grasp the position of the object substance at extremely low cost and, when the aberration of the object substance has occurred, specify the footprint of the communication device having received the date including the shot data and rapidly and infallibly recognize the fact that the aberration has occurred, aberration-occurring locality and aberration-occurring time.

Thus, the present invention can sort out an unprecedented, considerably highly dense system of surveillance, infallibly grasp the position of the object substance and, when aberration has occurred relative to the object substance, specify the aberration-occurring locality and rapidly and infallibly recognize the fact that the aberration has occurred, aberration-occurring locality and aberration-occurring time to infallibly and comprehensively enable infallible and comprehensive region crime-prevention, accident prevention and measure for safety.

The above and other objects, characteristic features and advantages of the present invention will become apparent to those skilled in the art from the description to be given herein below with reference to the accompanying drawings.

BRIEF DESCRIPTION OF THE DRAWINGS

FIG. 7 is a timing chart for illustrating the operation of the locator terminal device when aberrance has occurred.

FIG. 8 is a timing chart for illustrating the operation of the locator terminal device to call in a battery life.

DETAILED DESCRIPTION OF THE PREFERRED EMBODIMENT

A specific embodiment of the present invention will be described in detail hereinafter with reference to the drawings.

This embodiment relates to a monitoring system for monitoring (surveiling) a prescribed object to be monitored (object substance). This monitoring system is run by a security company and is capable of infallibly grasping at low cost the position of the object substance through building up throughout a town an infrastructure utilizing a wireless network, such as a wireless LAN (Local Area Network). In addition, this monitoring system utilizes an institution that controls surveillance and a movable body for a patrol that are disposed in each of surveillance regions, thereby enabling comprehensive surveillance in the region.

Incidentally, the object substance used herein means persons including school children on their way between school and home and various goods including automatic vending machines installed throughout a town and vehicles parked outdoors. The case where school children on their way between school and home are surveiled as the object substance will be described for the sake of convenience.

Figure 1:
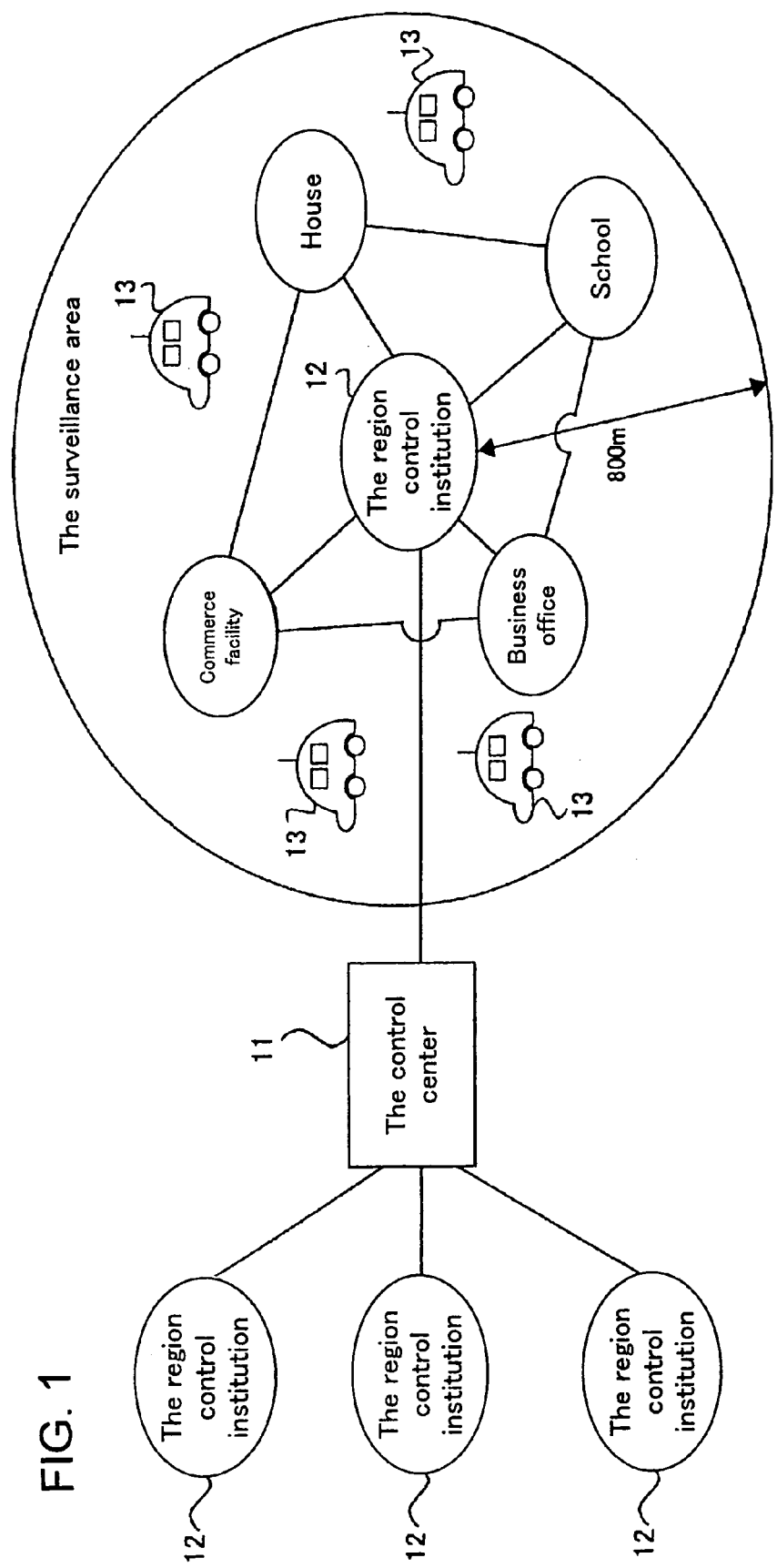
FIG. 1 is a schematic diagram illustrating the configuration of a monitoring system according to one embodiment of the present invention.

The monitoring system is configured as shown in FIG. 1 such that a control center 11 disposed in a metropolitan region, for example, and serving as a headquarters control institution and plural region control institutions each disposed in the prescribed surveillance region are connected via the IP (Internet Protocol) network such as so-called the Internet, or the prescribed network, such as a telephone communication.

The control center 11 is the institution owned by the security company running the monitoring system and disposed in a metropolitan region, for example. The control center 11, though not specifically shown, can communicate with the plural region control institutions 12, send call-outs to each region control institution 12 and receive from each region control institution abnormal state-occurring notices and various data including image data and audio data and store them. As a result, the control center 11 can monitor at all times how things go in the region over which each region control has jurisdiction.

The region control institutions 12 are also the institutions owned by the security company running the monitoring system, are disposed in every region having an area of 800 m in radius, and control surveillance around the clock, with the region as the surveillance region. Incidentally, the region having the area of 800 m in radius is a mere example, and the region control institutions 12 may be disposed in every region having an arbitrary area of 500 m or 300 m in radius, for example. The region control institutions 12 can communicate with the control center 11 or patrol vehicles 13 described later and receive various instructions from the control center 11 and various data including image data and audio data from the patrol vehicles 13 and/or school that is an surveillance object and store them and, at the same time, send an abnormal state-occurring notices and the various data to the control center 11. In addition, each region control institution 12 is configured such that it can receive transmit data from communication devices functioning as access points constituting wireless LANs built up within the surveillance region and, when the transmit data from the communication devices show that an abnormal state has occurred, send a notice of the abnormal state to the control center 11 and transmit a notice showing the abnormal state to the mobile communication terminal device, such as a mobile telephone or PDA (Personal Digital Assistants), of the user having requested the surveillance of a school child SC, such as a school official or benefactor, existing within the surveillance region. Furthermore, each region control institution 12 can transmit an email showing the abnormal state to the mobile communication terminal device of the user, such as the school official or benefactor, even when the abnormal state has occurred at school. Moreover, each region control constitution 12 can receive a call from the school within the surveillance region.

In this monitoring system, plural resident security agents that can be sent out at all times stay and patrol vehicles 13 as movable bodies are disposed in each region control institution 12.

Each patrol vehicle 13 is equipped with a so-called pan tilt zoom (PTZ) camera having both pan tilt in the prescribed direction and a zoom function at the prescribed magnifications or with an omnidirectional camera for omnidirectional imaging. In addition, the patrol vehicle 13 is equipped with a movable and/or stationary supplemental lighting installation, such as that for irradiating visible rays, infrared rays, laser rays, for example, in order to enable appropriate imaging at any time during the day and night. The patrol vehicle 13 uses these cameras to obtain and record the audio data and image date including dynamic picture images and successively transmit the corresponding data to the region control institutions 12. At this time, the patrol vehicle 13 transmit the data to the region control institutions 12 via the exclusive wireless LAN built up by the access points for wireless transfer. A so-called Global Positioning System (GPS) is used to grasp the location information of the patrol vehicle 13 and successively transmit the data to the region control institutions 12 via the wireless LAN.

At least four such patrol vehicles 13 are disposed within the surveillance region and periodically patrol within an area of 400 m in radius, for example, respectively. By so doing, only through the patrol by the patrol vehicles 13, the criminal suppression effect can considerably be enhanced. Incidentally, the area of 400 m in radius has a distance it takes a human being about five minutes on an average to walk and about two minutes on an average to run. On the other hand, it is said that the time a criminal takes to make an action, such as intrusion, is generally about five minutes. In the monitoring system, therefore, it is possible to organize an extremely high-density system of surveillance such that arrival at an abnormal state-occurring place upon detecting the occurrence of an abnormal state can be always attained within about two minutes and thus provide the user with security feeling incomparably higher than the arrival within about 25 minutes that has been attained by a conventional security company.

Figure 2:
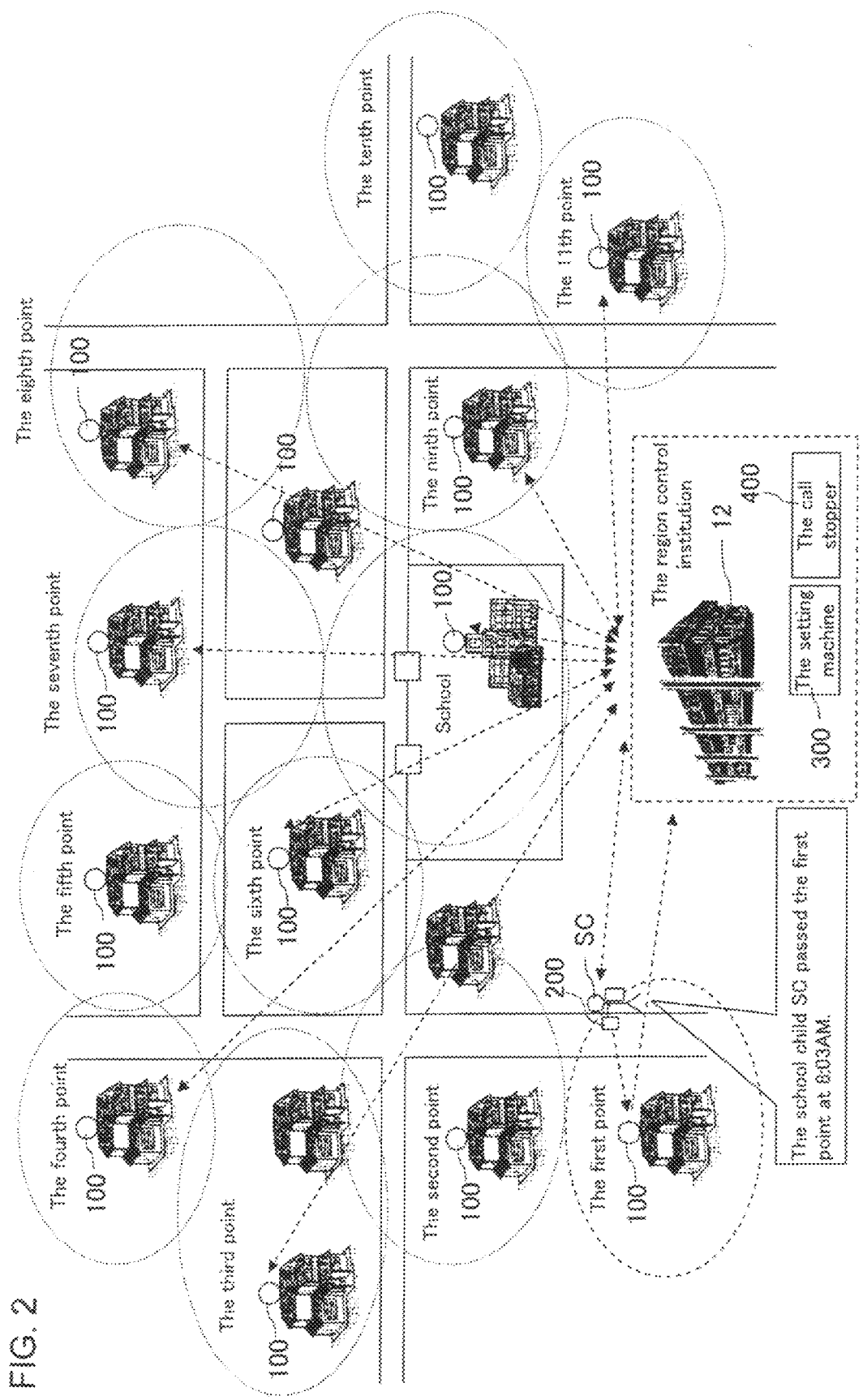
FIG. 2 a schematic diagram illustrating the configuration of a wireless LAN introduced in a surveillance region in the monitoring system.

In this monitoring system utilizing patrols by the patrol vehicles 13, installed are plural communication devices 100 functioning as the access points for building up a wireless LAN as shown in FIG. 2 pursuant to the prescribed radio transmission system, such as the standards of Institute of Electrical and Electronic Engineers (IEEE), 802, 11a, b, e and g or the so-called Bluetooth®, for example, and the data are routed via the communication devices 100. As a result, it is possible to build up an infrastructure capable of routing the data between the school and the region control institutions 12 or patrol vehicles 13 and between the patrol vehicles 13 and the region control institutions 12 and also capable of grasp the position of a school child SC taking along a locator terminal 200 on its way between school and home.

To be specific, the communication devices 100 are set in position on building structures, such as houses, electric poles, etc., existing along the routing line of school children attending school within the surveillance region and installed at a pitch of around 50 m, for example. In addition, each communication device 100 is provided with its peculiar identifier data. Furthermore, the communication device 100 receives the transfer data of the terminal device transmitted from the locator terminal 200 and utilizes the wireless LAN to transmit through routing, to the region control institution 12, data of the communication device produced on the basis of the received transmit date of the terminal device. Moreover, the communication device 100 may be configured as occasion demands such that it may transmit image data and audio data taken and/or acquired by cameras or microphones (not shown) provided the installed building structures and emails showing that the abnormal state has occurred to the region control institution 12 and, as occasion demands, to the patrol vehicle 13 running in the vicinity of the communication device and further to a mobile communication terminal device another user takes along.

Figure 3:
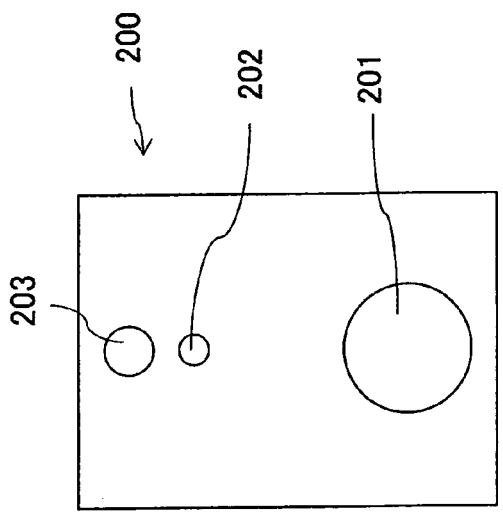
FIG. 3 is a front view illustrating the contour configuration of a locator terminal device in the monitoring system.
Figure 4:
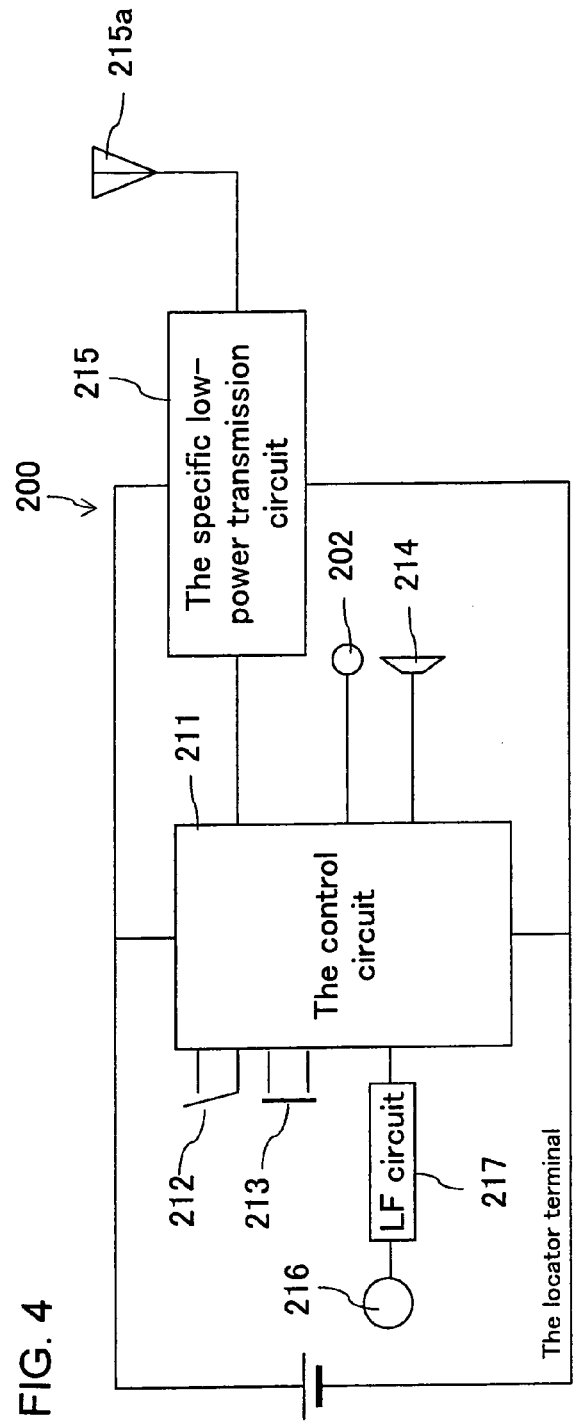
FIG. 4 is a block diagram illustrating the function configuration of the locator terminal device in the monitoring system.

On the other hand, the locator terminal 200 is taken along by the school child SC is commuting to and from school and, as shown in FIG. 3, comprises a box body having a push button 201 and a light-emitting device 202 formed of a Light-Emitting Diode (LED) exposed on the surface thereof when being seen from the outside. Incidentally, the box body is formed therein with an insertion hole 203 for a braid, such as a strap, so that the school child SC may readily take along it. The locator terminal 200 is provided therein, as shown in FIG. 4, with a control circuit 211 formed of a Central Processing Unit (CPU), a vibration switch 212 for transmitting to the control circuit 211 the vibration generated in the locator terminal 200 in response to the behavior, such as ambulation, of the school child SC, a push button switch 213 for transmitting to the control circuit 211 the fact that the push button 201 has been depressed, the aforementioned light-emitting device 202 for emitting light under the control of the control circuit 211, a buzzer 214 for outputting the prescribed sound under the control of the control circuit 211, a specific low-power transmission circuit 215 for transmitting the transmit date of the terminal device composed of the pulse waves produced by means of the control circuit 211 via an antenna 215a, and an LF coil 216 and an LF circuit 217 for communicating with a setting machine 300 installed in the region control institution 12 shown in FIG. 2 or a call stopper 400 taken along by the security agent residing in the region control institution 12 or getting in the patrol vehicle 13.

Figure 5:
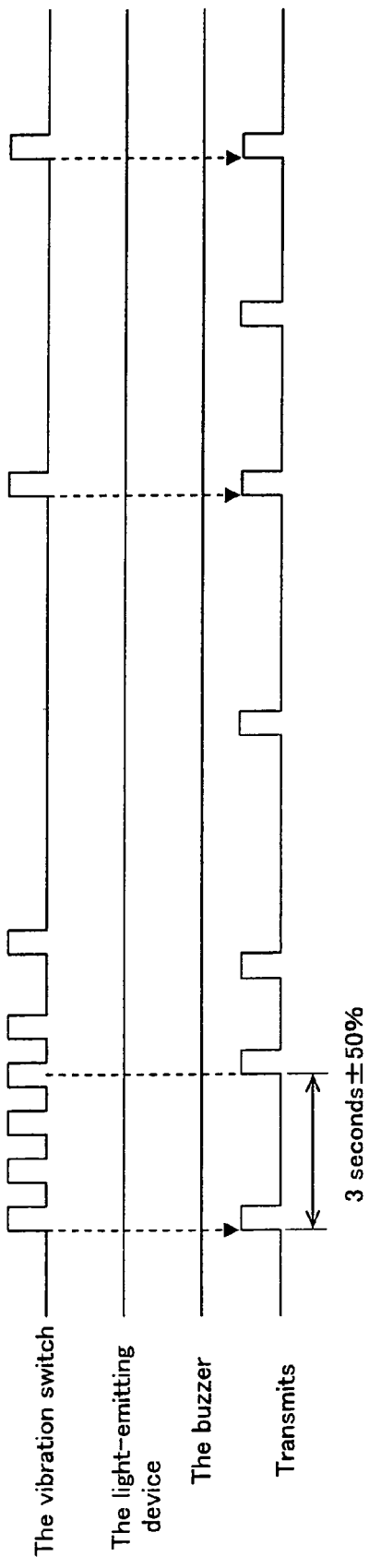
FIG. 5 is a timing chart for illustrating the operation of the locator terminal device at normal times.
Figure 6:
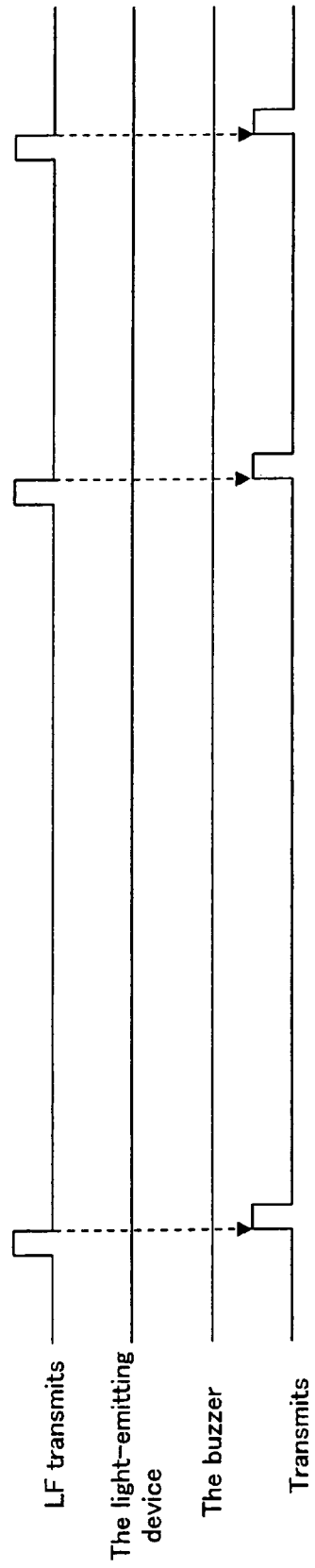
FIG. 6 is a timing chart for illustrating the operation set relative to the locator terminal device.

The locator terminal 200 continuously transmits at the predetermined time interval, during the course of detecting the vibration generated in response to the ambulation of the school child SC via the vibration switch 212 as shown in FIG. 5, for example, the transmit data of the terminal device including the identifier data peculiar to the locator terminal 200 under the control of the control circuit 211 by means of the specific low-power wireless communication of 426 MHz pursuant to standards STD-T67 of the Association of Radio Industries and Businesses (ARIB), for example. When only the vibration switch 212 has been operated in the abnormal state, the locator terminal 200 does not cause either the light-emitting device 202 to light up or the buzzer 214 to sound. In addition, the locator terminal 200, when having detected vibration only one time, transmits the transmit data of the terminal device the prescribed number of times at the prescribed interval, such as two times at the interval of three seconds. At this time, in the locator terminal 200, it is desired that the set transmission time interval be diffused to an extent of ±50% in order to avoid collisions of data due to the case where the plural locator terminals 200 continuously transmit the terminal device transmit data consisting of pulse waves concurrently. Incidentally, the identifier data, transmission time interval and number of transmissions of the locater terminal 200 are set via the setting machine 300 connected to a personal computer installed in the region control institution 12, and the set various data are stored in a memory (not shown) so that they may be read out by the control circuit 211. To be concrete, in the monitoring system, as shown in FIG. 6, for example, the locator terminal 200 receives via the LF coil 216 and LF circuit 217 the set signals transmitted from the setting machine 300 and stores the received date in the memory. As a result, answer signals are transmitted to the setting machine 300 via the specific low-power transmission circuit 215 to set various data. Incidentally, neither the identifier data nor an electronic image of the school child SC is stored in the locator terminal 200 and, in the monitoring system, the database in the region control institution 12 supports both the locator terminal 200 and the school child SC in relationship to each other.

In addition, the locator terminal 200, in reply to the school child SC having depressed the push button 201 for a period of the prescribed time of about one second or more, for example, when the abnormal state occurred, causes the buzzer 214 to sound for a short period of about 250 ms, for example, and then the light-emitting device 202 to light up at the prescribed time interval of about 100 ms as shown in FIG. 7 under the control of control circuit 211. Furthermore, the locator terminal 200 causes the light-emitting device 202 to light up under the control of the control circuit 211, as described above, and simultaneously transmits the terminal device transmit data including the identifier data peculiar to the locator terminal 200 and shot date showing the occurrence of the abnormal state continuously at the prescribed time interval through the specific low-power wireless communication having a frequency band of 426 MHz, for example, via the specific low-power transmission circuit 215. For example, the locator terminal 200 repeats its action comprising the steps of transmitting the terminal device transmit data for 40 seconds at the time interval of one second and thereafter providing a downtime of around 2 seconds. Also, at this time, it is desired that the set transmission time interval be diffused to an extent of ±50% in order to avoid collisions of data due to the case where the plural locator terminals 200 continuously transmit the terminal device transmit data consisting of pulse waves concurrently. Incidentally, the shot action of the locator terminal 200 cannot be stopped at all through the operation of the locator terminal 200, but stopped by the use of the setting machine 300 installed in the region control institution 12 or the call stopper 400 taken along by the security agent residing in the region control institution 12 or getting in the patrol vehicle 13 and further by the benefactor of the school child SC. Specifically, in the monitoring system, the locator terminal 200 disposed to be close to the call stopper 400 receives via the LF coil 216 and LF circuit 217 the call stopping signal transmitted from the call stopper 400 in reply to the depression of the prescribed button provided on the call stopper 400 to enable the shot action to be stopped.

Incidentally, the locator terminal 200 is driven by the electric power supplied from the prescribed battery. Therefore, the locator terminal 200 needs a new battery at the prescribed timing, such as at the beginning of the new school term, and has a function to notify the battery life. To be specific, the locator terminal 200 measures the voltage of the battery under the control of the control circuit 211, only when starting the transmission of the terminal device transmit data upon detecting the vibration via the vibration switch 212, in order to reduce the battery drain as shown in FIG. 8, for example. When the measured voltage has been not more than the prescribed voltage, thereafter the buzzer 214 is caused to continuously sound until the remaining capacity of the battery becomes nil or the battery is replaced with a new one, thereby notifying the battery drain.

In this monitoring system having the wireless LAN built up using the communication device 100 and locator terminal 200, when the school child SC starts home for arriving at school, the data recorded in an Integrated Circuit (IC) card peculiar to the school child SC, such as an IC card having built therein a non-contact type transponder in the so-called Radio Frequency Identification System (RFID) are read out with the prescribed card reader installed at home to perform the authentication operation. In reply thereto, the region control institution 12 takes the authentication treatment based on the data transmitted from the card reader and, when the authentication has been decided to be reasonable, notifies the mobile communication terminal device taken along by the user, such as the school official or the benefactor of the school child, of the facts that the authentication of the school child SC has been completed and that the school child SC has started arriving at school in the form of an email. Furthermore, the school official logs-in to the prescribed website provided by the security company via the personal computer installed in the school, thereby enabling substantially real-time confirmation on whether or not each of the school children SC starts arriving at school or has reached at school.

Furthermore, in the monitoring system, the terminal device transmit data including the identifier data peculiar to the locator terminal 200 are transmitted from the locator terminal 200 to the nearest communication device 100 every time the school child SC walks during the course of commuting to school. Upon receiving the terminal device transmit data, the communication device 100 adds the identifier data peculiar to the communication device 100 and present time information showing the present time to the received terminal device transmit data. In addition, in the monitoring system, the communication device transmit data produced by the communication device 100 are subjected to routing utilizing the wireless network to transmit them to the region control institution 12. As a result, in the monitoring system, it is possible for the region control institution 12 to infallibly grasp which of the school children SC has passed which of the points at what time on the basis of the identifier date of the locator terminal 200, identifier data of the communication device 100 having received the terminal device transmit data and time information having received the terminal device transmit data. Furthermore, in the monitoring system, in the case where the shot has occurred due to the operation of the push button 201 on the locator terminal 200 by the school child SC, the terminal device transmit data including the shot data comprising a pattern different than usual are transmitted to the nearest communication device 100, and the communication device transmit data produced in consequence of having the identifier data peculiar to the communication device 100 and the present time information showing the present time added to the terminal device transmit data are transmitted to the region control institution 12. As a result, in the monitoring system, the region control institution 12 can rapidly and exactly recognize the fact that the abnormal state has occurred relative to the school child SC taking along the locator terminal 200 and abnormal state-occurring place and time.

Moreover, in the monitoring system, when the school child SC starts going out of school for commuting from school, the data recorded in the IC card peculiar to the school child SC, such as the IC card having built therein the non-contact type transponder in the RFID are read out with the prescribed card reader installed in the school to perform the authentication operation. In reply thereto, the region control institution 12 takes the authentication treatment based on the data transmitted from the card reader and, when the authentication has been decided to be reasonable, notifies the mobile communication terminal device taken along by the user, such as the school official or the benefactor of the school child, of the facts that the authentication of the school child SC has been completed and that the school child SC has started going out of school in the form of an email. Also in this case, it is possible for the school official to log-in to the prescribed website provided by the security company via the personal computer installed in the school, thereby enabling substantially real-time confirmation on whether or not each of the school children SC starts commuting from school or has reached at home.

In this way, it is believed that there has been no example in which a security company builds up a wireless LAN exclusive for surveillance in every region. In the monitoring system of the present invention, the buildup of the wireless LAN makes it possible to use wireless sensors or wired sensors in a mixed state under the circumstances of a broadband or narrowband and to provide automated notification, remote supervision and other high added-value services.

As described in the foregoing, in the monitoring system according to the present embodiment of the present invention, by disposing the region control institution 12 in each surveillance region, patrolling the patrol vehicles 13 and building up the wires LAN over the entire surveillance regions via the communication devices 100, it is made possible to lay out an unprecedented system of surveillance with extremely high density. Therefore, in the monitoring system, it is possible to provide criminals with recognition that "this region is protected with a high-level system of surveillance" and considerably enhance the crime-suppressing effect.

Moreover, in the monitoring system, by causing the school child SC commuting to and from school to take along the locator terminal 200 and continuously transmitting the wireless signals from the locator terminal 200 to the communication device 100, the region control constitution 12 can infallibly grasp which of the school children SC passes through what point at what time and, at the same time, when the abnormal state has occurred relative to the school child SC commuting to and from school, specify as the abnormal state-occurring place the footprint of the communication device 10 that has received the terminal device transmit data including the shot data and rapidly and exactly recognize the fact that the abnormal state has occurred and the abnormal state-occurring place and time. In the monitoring system, by building up the infrastructures utilizing the wireless LAN throughout a town, the connection fees are not so high as compared with those required for the conventional position-grasping technique utilizing the GPS, and it is possible to surveil at very low cost the positions of the school children SC in detail, with a small area of the footprint of one communication device 100 as a unit. Furthermore, in the monitoring system, by providing inexpensive lines by the exclusive wireless LAN, it is possible to enhance the security property on receipt and transmission of data and perform infallible communications owing to the stabilized band frequency.

Moreover, the monitoring system has the region control institutions 12 and patrol vehicles 13 disposed in each surveillance region having the prescribed area and, when the abnormal state has occurred relative to the school child SC commuting to and from school, can specify as the abnormal state occurring place the footprint of the communication device 100 that has received the terminal device transmit data including the shot data. Therefore, the patrol vehicle can rapidly rush to the abnormal state occurring place to enable the comprehensive surveillance in the surveillance region.

Thus, the monitoring system can realize extremely high anticrime measures and anti-disaster measures including safety measures for school children SC besides anticrime measures, anti-disaster measures and safety measures for regions, support urban development providing secure and easygoing livelihood and contribute to a society enabling provision of fair and secure livelihood.

Incidentally, the present invention is not limited to the aforementioned embodiment. Though the embodiment has been described as using the non-contact type IC card for individual authentication as the school child SC authenticating method, the present invention may adopt as the authenticating method the biometrics verification that utilizes the bodily characteristics and bodily nature of school children SC and includes the retina verification, voiceprint verification, fingerprint verification, blood vessel verification, palm-reading verification, lineament verification and handwriting authentication.

In addition, though the embodiment has been described as citing a school as the object to be surveiled and surveiling school children SC commuting to and from the school as the object substances, the present invention is effective when being applied to students taking private school and may be used to surveil persons belonging to commerce facilities, business offices, dwelling houses and other various facilities Furthermore, while the embodiment has been described citing the case where school children SC commuting to and from school are subjected to surveillance as object substances, the present invention can be applied to the surveillance of animals, such as pets, automatic vending machines and cash dispensers installed throughout a town, vehicles, two-wheeled motor vehicles and bicycles parked outdoors, boats and ships moored in port, personal computers and cashboxes installed indoors and other variables, cultural assets, such as Buddha statues enshrined in the prescribed building structures and other arbitrary goods, not to mention persons including advancing age other than the school children SC. In the monitoring system, for example, in the case where the object substance is a person or animal, as described above, the person takes along the locator terminal 200 and, in the case where vibration resulting from the activity, such as ambulation, has been detected, may transmit the terminal device transmit data. On the other hand, the monitoring system may have the locator terminal 20 built therein in the case where the object substances are goods. In the monitoring system, however, when the object substances are goods, since the goods are generally left at rest, unlike the case where the object substances are persons or animals, the monitoring system is fated to built in a locator terminal 200 capable of transmitting terminal device transmit data when vibration etc. cannot be detected and, at the same time, switching to transmission of the terminal device transmit data including the shot date, with the detection of the vibration occurring in the locator terminal 20 when the goods are intended to move as a trigger.

It goes without saying that the present invention can appropriately be modified within the range without departing from the gist thereof.

What is claimed is:

1. A monitoring system for surveiling an object substance, comprising:

plural movable bodies periodically patrolling surveillance areas each having a prescribed area and acquiring image data and/or audio data showing statuses during a patrol;

an area local control institution installed in each of the surveillance areas for receiving from the movable bodies and storing various data including the image data and/or audio data;

plural communicating devices installed in the surveillance areas for functioning as access points for building up a wireless network;

a terminal device that the object substance takes along or the object substance is provided with; and a call stopper operated when the call stopper is in a vicinity of the terminal device, wherein, when in a normal time, said terminal device transmits transmit data including identifier data peculiar to the terminal device to a nearest communication device continuously, said terminal device does not store any information of the object substance and said terminal device supports the terminal device and the object substance in relationship to each other through a database present in the area local control institution in the monitoring system, said communication devices, upon receiving the transmit data, produce communication device transmit data having identifier data peculiar to the communication devices and present time data showing a present time added to the transmit data of the terminal device and transmit the produced communication device transmit data to the area local control institution utilizing the wireless network, said area local control institution constantly captures a position of the object substance by constantly capturing a position of the terminal device based on the identifier data of the terminal device included in the communication device transmit data of the communication devices, the identifier data of the communication devices having received the transmit data of the terminal device, and the present time data having received the transmit data of the terminal device, and wherein, when an aberrance has occurred, said terminal device transmits continuously to the nearest communication device another transmit data including the identifier data peculiar to the terminal device and shot data showing that the aberrance has occurred, said communication devices, upon receiving the another transmit data of the terminal device, produce the communication device transmit data having the identifier data peculiar to the communication devices and the present time data showing the present time added to the another transmit data of the terminal device and transmit the produced communication device transmit data to the area local control institution utilizing the wireless network, said area local control institution captures that the aberrance has occurred to the object substance, and a location and a time of the aberrance occurred based on the identifier data of the terminal device included in the communication device transmit data of the communication devices, the identifier data of the communication devices having received the another transmit data of the terminal device, and the present time data having received the another transmit data of the terminal device, and said terminal device cannot stop transmission of the another transmit data by the terminal device transmitting the another transmit data and stops transmission of the another transmit data of the terminal device upon operation of the terminal device and receiving a call-stop signal transmitted from the call stopper upon an operation of the call stopper in a condition only when said terminal device is disposed close to the call stopper which is taken along by a security agent in said area local control institution or a security agent in one of said movable bodies, or the call stopper which is carried by a relevant party of the object substance.

2. A monitoring system according to claim 1, wherein the terminal device measures voltage of a battery to which a driving power is supplied and, when the measured voltage is not more than a prescribed voltage, the terminal device notifies that the voltage is not more than the prescribed voltage.

3. A monitoring system according to claim 2, wherein the terminal device measures the voltage of the battery only when an operation of transmitting the transmit data of the terminal device starts.

4. A monitoring system according to claim 1, wherein the terminal device includes a coil and circuit, through which the call-stop signal transmitted from the call stopper is received.

* * * * *